United States Patent Office 3,444,375
Patented May 13, 1969

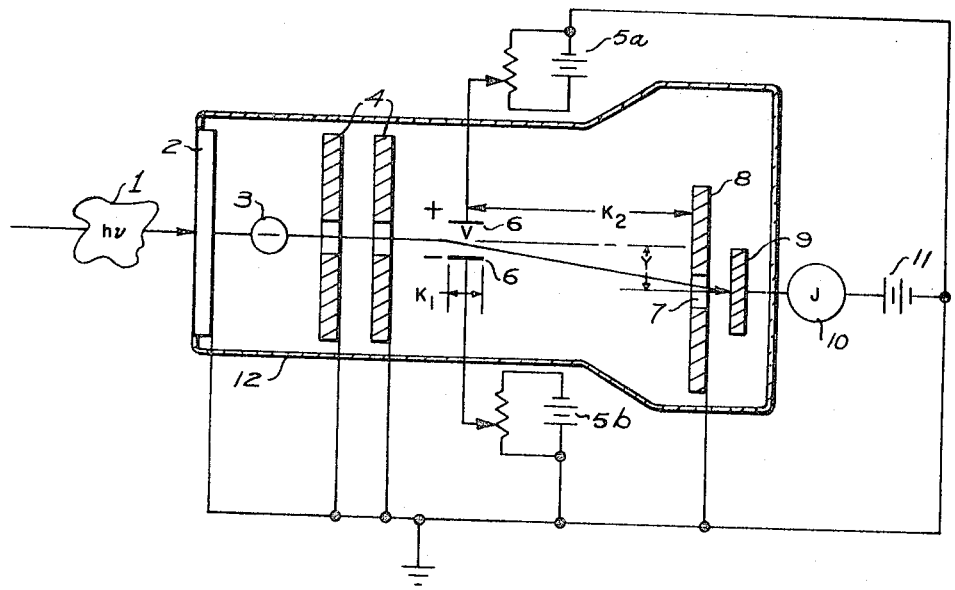

3,444,375
PHOTOELECTRIC ENERGY SPECTROMETER
Robert C. Seamans, Jr., Deputy Administrator of the National Aeronautics and Space Administration, with respect to an invention of Randolph A. Becker, Altadena, Calif.
Filed July 27, 1966, Ser. No. 568,356
Int. Cl. G01t 1/16; H01j 39/14
U.S. Cl. 250—83.3                                    4 Claims

ABSTRACT OF THE DISCLOSURE

A photocathode emits electrons in response to the impingement of photons thereon. The velocity of the emitted electrons is determined by the frequency of the impinging radiation. The electrons pass through a collimating means and thereafter through a deflecting means. A discriminator comprising a plate having an "off axis" aperture permits electrons which are deflected to pass therethrough to a collecting target.

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to a spectrometer employing neither a prism nor a grating yet capable of yielding continuous spectral data. The novelty of the invention resides in the manner in which the spectral data is obtained, namely, by doing a spectral analysis of the photoelectrons released from a photocathode upon which light has impinged.

Most spectrometers as found in the prior art use either a prism or grating. The prism consists of expensive optical glass, while the grating contains thousands of finely spaced lines, making both types of instruments quite expensive. Moreover, most instruments in the prior art, because of their construction, are much heavier in weight than the subject invention.

Accordingly, an object of this invention is to provide an instrument capable of spectral analyses and yet using neither a prism nor a grating.

Another object of this invention is to provide an instrument whose light weight makes it suitable for outer space investigations, while, of course, not restricting it to this field.

Another object of this invention is to provide a spectrometer with no mechanical moving parts. This would make it suitable for use in environments where extremes in temperature are encountered.

Yet another object of this invention is to provide a novel spectrometer on a spacecraft which can yield data on the instantaneous spectral transmission of the earth's atmosphere at any given earth observation point. This can be achieved by the simultaneous observation of a predetermined celestial body from both the moon and from one or more locations on earth. Stated differently, the filtering characteristics of the earth's atmosphere on electromagnetic radiation could be determined.

This invention is based on the photoelectric effect and a brief review of the subject may be useful. Certain materials, usually metals, emit electrons when light above a certain minimum threshold frequency $\nu_0$ impinges upon them. The threshold frequency varies with the material but is usually at least in the ultra-violet range, although some oxides will emit electrons when light in the visible range impinges upon them. Photoelectrons are electrons emitted as a result of the photoelectric effect, and, once emitted, are indistinguishable from electrons produced by other means.

Light striking a metal must have a certain minimum energy before any photoelectrons are released. This minimum energy relates to a term called the work function of the material. The work function of a material is the work that must be done to take an electron through the material surface from just beneath it, and more work or energy is required when the electron originates deeper in the material. The work function for various materials may be found in various handbooks.

According to modern physics, the energy in the incident light is not continuous but comes in small packets or quanta, each quantum or photon being proportional to the frequency $\nu$. Stated in equation form, $$E_q = h\nu \qquad (1)$$

where $E_q$ = the energy in joules in each quantum
$h$ = Planck's constant = $6.63 \times 10^{-34}$ joule-sec.
$\nu$ = the frequency in cycles per second.

Each photoelectron will have a kinetic energy proportional to the energy, $h\nu$, of the photon which ejected the electron; i.e., $$\tfrac{1}{2}mv^2 = h(\nu - \nu_0) \qquad (2)$$

where $h\nu_0$ = work function of the photocathode in electron volts
$m$ = the mass of the electron = $9.108 \times 10^{-31}$ kilograms
$v$ = the velocity of the electron in meters per second.

The number of electrons having this energy, $\tfrac{1}{2}mv^2$, will be directly proportional to the product of the number of photons having wavelength $c/v$ and the quantum efficiency of the photocathode at frequency $\nu$. Quantum efficiency may be defined as the number (not necessarily an integer) of electrons released for each photon absorbed by the photocathode. The quantum efficiency can be determined by calibration techniques. The problem then is one of determining the number of electrons emitted at all different energy levels.

It should be pointed out that, in the prior art, $\gamma$-ray wave lengths have been evaluated by making use of the fact that these $\gamma$-rays eject high speed photoelectrons from materials on which they fall. This is shown, for example, by J. D. Stranathan, in his book, "The 'Particles' of Modern Physics" on page 350. Also, Henry Semat, in his book, "Introduction to Atomic Physics," on page 292, points out that sharp line beta-ray spectra have been produced by a type of photoelectric effect in which some of the $\gamma$-rays from the nucleus ejected electrons form the inner shells of an atom.

However, in this invention, we are dealing with visible light and not the much shorter $\gamma$-rays which are much more energetic. Also, in this invention, the electrons which are ejected as photoelectrons are free electrons rather than atomic shell electrons as in the case of gamma-ray spectroscopy.

What is proposed in this invention is a way to perform an energy spectral analysis on the electrons emitted from the photocathode by a simple system similar to a mass spectrometer. In this case, however, the mass of all particles is the same. The device would perform the spectral separation on the basis of kinetic energy, which is, of course, proportional to velocity squared.

A simple sketch of such a device is given in the sole figure of the drawing. Photoelectrons 1 having a frequency $\nu$ and energy $h\nu$ impinge upon the thin, transparent or semi-transparent photocathode 2. All electrons 3 released from the photocathode 2 and not directed in an axial direction are collected by the collimating plates 4. When the electrons are within the electrostatic field produced by voltage sources 5a and 5b across the deflection plates 6, they are deflected in a direction toward the slit 7 of the electron selector plates 8. Only those electrons having a certain velocity $v$ determined by the frequency $\nu$ of the impinging radiation will pass through the slit 7. An anode collector 9 collects the electrons. A current indicating instrument 10 indicates the relative amount of electrons collected at any frequency $\nu$. A slight positive potential is impressed on the anode collector 9 to induce a current of the collected electrons through the ammeter 10.

The device works as follows. A photon 1 of energy $h\nu$ ejects an electron 3 of energy $\frac{1}{2}mv^2 = h(\nu - \nu_0)$ from the photocathode 2. If the velocity of this electron is not almost normal to the plane of the photocathode, it will be stopped by the baffles 4. If not intercepted by the baffles, the electron will pass through the deflection plates 6 and will be deflected in a direction by a force $V \cdot e$ in newtons where V is the potential field in volts between the deflection plates 6.

$$V \cdot e = ma_\gamma = \text{deflection force} \qquad (3)$$

where $a_\gamma$ is the acceleration in meters per sec.$^2$ in the direction of the electric field V. Hence, the electron is given a velocity component in meters per second in the direction of the electric field given by $$v_\gamma = a_\gamma t_1 = \frac{V \cdot e}{m} t_1 \qquad (4)$$

where $t_1$ = time in seconds in the field V.

Now, $t_1$ will be equal to the distance $K_1$ in meters across the potential field, in the direction of original travel, divided by the original velocity $v$ of the electron.

However, from Equation 2

$$v^2 = \frac{2h(\nu - \nu_0)}{m} \qquad (5)$$

and, therefore, $$v = \left[ \frac{2h(\nu - \nu_0)}{m} \right]^{1/2} \qquad (6)$$

If the distance across the electric deflection field is a constant $K_1$, then, $$t_1 = \frac{K_1}{v} = K_1 \left[ \frac{2h(\nu - \nu_0)}{m} \right]^{-1/2} \qquad (7)$$

and we can re-write Equation 4 as follows:

$$v_\gamma = \frac{VeK_1}{m} \left[ \frac{2h(\nu - \nu_0)}{m} \right]^{-1/2} \qquad (8)$$

The deflection $y$ in meters which the electron has experienced at the time it reaches the plane of the slit 7 will be given by $$y = v_\gamma t_2 \qquad (9)$$

where $t_2$ = time in seconds of transit from field V to the slit. If the distance from the deflection plates to the plane of the slit is a constant $K_2$, then, $$t_2 = K_2/v = K_2 \left[ \frac{2h(\nu - \nu_0)}{m} \right]^{-1/2} \qquad (10)$$

From Equations 8 and 10 we can re-write (9) as follows:

$$y = \frac{VeK_1 K_2}{m} \left[ \frac{2h(\nu - \nu)_0}{m} \right]^{-1} = \frac{VeK_1 K_2}{2h(\nu - \nu_0)} \qquad (11)$$

Now, the quantities $e$, $K_1$, $K_2$ and $h$ are all constants and can be lumped into a constant $K_3$. Thus, Equation 11 becomes $$y = K_3 \frac{V}{\nu - \nu_0} \qquad (12)$$

where $$K_3 = eK_1 K_2 / 2h \qquad (13)$$

As stated before $y$ is the deflection in meters necessary to enter the slit 7 and thus produce a current in the anode circuit. Then, for current $J$ to flow in the anode circuit, we have, from Equation 12, the linear relationship between the deflection voltage and the photon frequency given by $$\nu - \nu_0 = \frac{K_3}{y} \cdot V = KV \qquad (14)$$

where $K = K_3/y$
from which we write $$\nu = KV + \nu_0 \qquad (15)$$

Since, $$\nu = c/\lambda \qquad (16)$$

where $c$ = velocity of light in meters per second, we may write $$c/\lambda = KV + \nu_0 \qquad (17)$$

$$\lambda = \frac{c}{KV + \nu_0} \qquad (18)$$

In conclusion, for any deflection voltage V there will be an associated photon wavelength $\lambda$ given by Equation 18. The current J as read on the meter will be proportional to the quantum efficiency at the wavelength $\lambda$ times the number of photons of wavelength $\lambda$ impinging upon the photocathode. Hence, the photon flux as a function of wavelength (i.e., the spectral emission of a source) may be determined by the relationship of anode current to deflection voltage.

The equation for the current, at any frequency $\lambda$, which can be measured directly, is as follows:

$$J_\nu = N_\nu \cdot Q_\nu$$

where $N_\nu$ = number of photons of frequency $\nu$ impinging upon the photocathode per unit time, and $Q_\nu$ = quantum efficiency of the photocathode for photons of frequency $\nu$; i.e., number of photoelectrons released per number of photons incident.

Note that, since $\nu = c/\lambda$, $Q_\nu = Q_\lambda$, $J_\nu = J_\lambda$, and $N_\nu = N_\lambda$, this may just as easily be written in the form $$J_\lambda = N_\lambda \cdot Q_\lambda$$

$N_\lambda$ can be determined with the aid of a thermopile and suitable calculations, for purpose of calibration.

The quantity $Q_\nu$ is determined by laboratory calibration procedures. A measurable quantity, $N_\nu$, of photons is directed onto the photocathode by means of a monochromator. With the deflection voltage set to obtain a maximum value of J, the current $J_\nu$ is read out. Thus, $Q_\nu$ is determined from $$Q_\lambda = J_\lambda / N_\lambda$$

To summarize the operation of the instrument:

Within the special limitations of the instrument, electromagnetic radiation at a frequency $\nu$, determined by V and the constants of Eq. 18, will cause a deflection of the meter J. The amount of deflection will be proportional to the intensity of the radiation incident upon the photocathode. However, since the efficiency of the photocathode is not, in general, linear over the whole spectral range of the instrument, the current $J_\nu$ will not be directly proportional to $N_\nu$, the number of impinging photons. Therefore, the quantum efficiency $Q_\nu$ must be determined for every frequency $\nu$. The meter scale may then be adjusted so that it indicates the intensity at any frequency $\nu$.

The instrument herein described was originally designed for outer space use where vacuum conditions exist. Under such conditions, the instrument need not be hermetically sealed. However, it is not intended to restrict its use to outer space environments. Therefore, the instrument is provided with an outer envelope, at least partially made of a transparent material. This envelope is designated by the numeral 12 on the figure.

It should be appreciated that those familiar with the art may make various modifications and variations without departing from the spirit and scope of the invention. It is therefore, to be understood that within the scope of the appended claims, the invention may be practiced otherwise than as specifically described.

What is claimed is:

1. A spectrometer for the infrared, visible and ultraviolet spectrum comprising:

a hermetically sealed enclosure having a transparent area;

an electron emitting means disposed within said enclosure adjacent to said transparent area for emitting electrons in response to incident electromagnetic radiation;

a collimating means mounted within said enclosure for collimating said electrons in a predetermined axial direction;

a deflecting means mounted within said enclosure and in operative proximity to said collimated electrons for fixedly deflecting said collimated electrons from said predetermined axial direction;

a plate disposed within said enclosure; said plate having an aperture positioned for passing certain of the said deflected electrons;

a collector means within said enclosure for collecting the passed electrons; and a detecting means connected to said collector means for detecting the collected electrons, which indicates the spectral emission of the said incident electromagnetic radiation.

2. The spectrometer as recited in claim 1, wherein the said collimating means comprises at least one circular disc having an opening therein.

3. The spectrometer as recited in claim 1, wherein the deflection means comprises at least one pair of plates across which is impressed a voltage.

4. The spectrometer as recited in claim 1, wherein the detecting means comprises a current indicating instrument.

References Cited

UNITED STATES PATENTS

| 2,642,535 | 6/1953 | Schroeder. |
| 2,946,895 | 7/1960 | Stoudenheimer et al. __ 250—213 |
| 3,355,616 | 11/1967 | Hecker et al. _____ 313—65 |

ARCHIE R. BORCHELT, *Primary Examiner.*

U.S. Cl. X.R.

313—65